Figure 1:
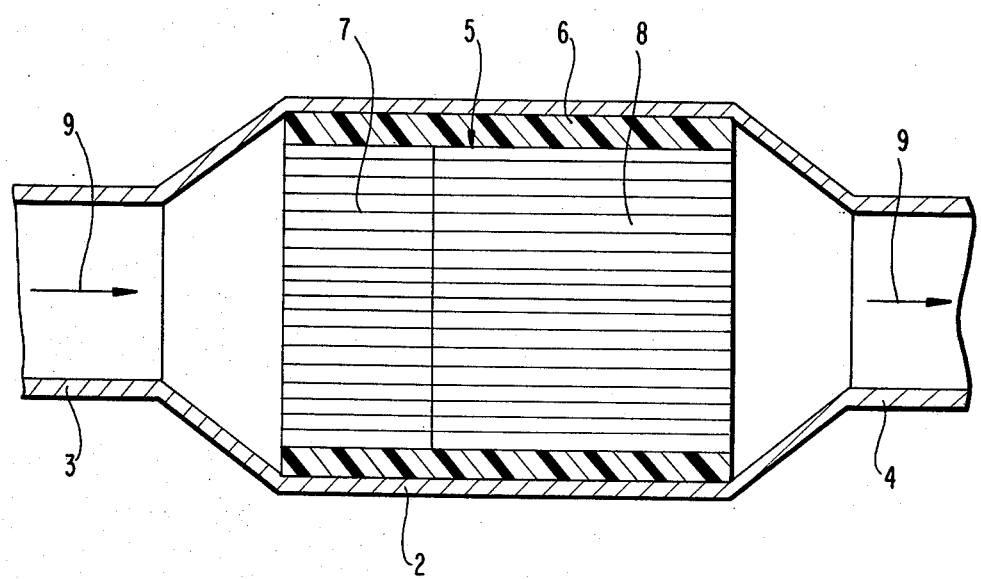

United States Patent [19]

Völker et al.

[11] 4,134,733

[45] Jan. 16, 1979

[54] APPARATUS FOR TREATMENT OF EXHAUST GASES

[75] Inventors: Herbert M. Völker, Hanau; Polat Öser, Wolfsburg; Gerhard Döring, Wolfsburg; Harald Koch, Wolfsburg, all of Germany

[73] Assignee: Deutsche Gold- und Silber-Scheideanstalt vormals Roessler, Frankfurt am Main, Germany

[21] Appl. No.: 860,418

[22] Filed: Dec. 13, 1977

Related U.S. Application Data

[63] Continuation of Ser. No. 702,558, Jul. 6, 1976, abandoned.

[30] Foreign Application Priority Data

Jul. 9, 1975 [DE] Fed. Rep. of Germany ....... 2530822

[51] Int. Cl.² ............................ B01J 8/00; F01N 3/15
[52] U.S. Cl. ................................. 422/177; 252/477 R; 423/213.2; 422/176; 422/180
[58] Field of Search ........ 23/288 F, 288 FA, 288 FB, 23/288 FC; 252/477 R; 423/213.2, 213.5, 403

[56] References Cited

U.S. PATENT DOCUMENTS

| 1,452,145 | 4/1923 | Cederberg | 423/403 |
| 2,730,434 | 1/1956 | Houdry | 23/288 R |
| 2,898,202 | 8/1959 | Houdry et al. | 23/288 FB |
| 2,946,651 | 7/1960 | Houdry | 23/288 FB |
| 3,247,254 | 4/1966 | Eckhart et al. | 252/477 R X |
| 3,380,810 | 4/1968 | Hamblin | 23/288 F |
| 3,410,651 | 11/1968 | Brandenburg et al. | 23/288 F |
| 3,754,870 | 8/1973 | Carnahan et al. | 23/288 FB |
| 3,785,781 | 1/1974 | Hervert et al. | 23/288 FB |
| 3,915,658 | 10/1975 | Scheitlin et al. | 23/288 FC |
| 3,981,685 | 9/1976 | Fennessy | 23/288 F |
| 4,026,992 | 5/1977 | Shiga et al. | 423/239 A |

*Primary Examiner*—Morris O. Wolk
*Assistant Examiner*—Roger F. Phillips
*Attorney, Agent, or Firm*—Beveridge, DeGrandi, Kline & Lunsford

[57] ABSTRACT

A catalytic converter for use in the exhaust line of an internal combustion engine wherein the catalytically active noble metal coating is deposited only on the rearward portion of the inert carrier, with respect to the direction of flow of the exhaust gases, said inert carrier being fully coated with a washcoat capable of absorbing catalyst poisons before application of the catalytically active noble metal coating.

3 Claims, 2 Drawing Figures

APPARATUS FOR TREATMENT OF EXHAUST GASES

This is a continuation of application Ser. No. 702,558 filed July 6, 1976, now abandoned.

The present invention relates to an apparatus for the treatment of the exhaust gases of an internal combustion engine, and more particularly, to an apparatus for the elimination of the harmful substances contained in exhaust gases by catalytic conversion. The catalytic converter of this invention contains a catalyst which comprises an inert carrier material provided with a catalytically active coating and which is inserted into the exhaust gas line of an internal combustion engine.

Throughout the world, there is concern about air quality and efforts are being made at the present time to eliminate those portions of substances which may be considered to be injurious to health and which are contained in the exhaust gases of internal combustion engines, especially the engines of motor vehicles. These harmful substances consist essentially of carbon monoxide, unoxidized hydrocarbons and oxides of nitrogen. Thermal and catalytic secondary combustion systems were developed for the elimination of these harmful substances produced by the inefficient and incomplete combustion in the internal combustion engines.

The catalytic secondary combustion systems have a catalyst inserted into the exhaust gas line of an internal combustion engine which consists of a catalytically inert carrier material, which is provided with a firmly adherent, catalytically active coating causing the chemical conversion of the harmful components of the exhaust gas into harmless substances. As is known in the art, the inert carrier can either be in particle form or in the form of a monolithic or unitary material. The catalytically active coatings are generally noble metals of the platinum group, i.e.., platinum, palladium, rhodium and the like. Mixtures of these may also be used as is known in the art.

In the case of a particulate material catalyst, the exhaust gas carrying the harmful components passes between, over, under and around the individual particles of the bulk material coated with a layer of noble metal. In the case of a monolithic catalyst, the exhaust gas flows through the continuous, essentially parallel, channels disposed in the catalyst body. During the passage of the exhaust gas through the inert carrier material provided with the catalytic noble metal coating, the conversion of the harmful components of the exhaust gas into harmless components takes place. Details of the nature of the inert carrier, the catalytically active elements and the geometrical configuration of these catalyst systems are now well known in the art.

In addition to the harmful components mentioned above, the exhaust gases may also carry along with them certain other materials contained in the operating fuels. These other materials which are contaminants include; for example, lead, phosphorus and zinc compounds. In the course of the operation of an internal combustion engine equipped with a catalytic exhaust gas purification system, these contaminant compounds are deposited among other things on the surface of the catalysts. Over a period of time, these deposits may lead to a decrease of the catalytic action. This problem is referred to in the art as "poisoning" of the catalysts.

It has now been found, that the deposits of these poisoning components preferably precipitate on the forward areas of the catalyst, relative to the direction of the flow of the exhaust gas, and thereby impair the effectiveness of the catalytic action of the noble metals present in these areas.

The object of the present invention is to create a system for the purification of exhaust gases as described above which is less susceptible to "poisoning" by admixtures, such as lead, phosphorus and zinc, contained in the fuel and which system maintains its catalytic effectiveness essentially without great changes even over extended distances of travel.

The object of the invention is achieved by the feature of the present invention which resides in depositing the catalytically active coating containing the noble metal or mixture thereof only on the rearward portion of the catalytically inert carrier, relative to the direction of flow of the exhaust gas. According to the invention, the inert carrier material has an efficient absorbing surface free of any coating of noble metal, in the forward area of the catalyst, relative to the direction of flow of the exhaust gas.

According to a more detailed aspect of the invention and with respect to an inert carrier which is in the geometric configuration of a monolith, a length of at least about 2.5 cm (corresponding to about 1 inch) is provided free of noble metal for the absorption of the admixtures sought to be removed which are contaminants in the fuel.

In the case of the manufacture of the catalyst according to the invention, the relatively expensive coating of noble metal is applied only in the areas of the inert carrier in which no deposit or only a small deposit of substances impairing the catalytic effect, may take place. On the other hand, in the forward area of the catalyst, viewed in the direction of flow, which extends at an axial length of at least about 2.5 cm, the inert carrier material is to be provided with a surface which absorbs as well as possible, but in any case is without a coating of noble metal, on which then substantially all of the admixtures of the operating agent carried along with the exhaust gases, such as the lead, phosphorus and zinc compounds, can precipitate without harmful effects.

In accordance with a particular embodiment of the present invention, the inert carrier material is formed of a monolithic carrier body with axially continuous flow channels which are parallel to the direction of flow of the exhaust gas. This carrier material has a forward section relative to the direction of flow and, again viewed in the direction of flow of the exhaust gas, a rearward section. Only the rearward section of the carrier is provided with the catalytically active coating containing the noble metal or mixture thereof.

In another aspect of the invention, the catalytic converter can also include a container filled with bulk particulate material as the inert carrier material. The container or cannister may be divided into multiple chambers; as for example, a first partial container located in front, relative to the direction of flow of the exhaust gas, for the absorption of the contaminants and in a second partial container disposed behind the first partial container, relative to the direction of flow of the exhaust gas, for the reception of bulk material coated with catalytically active noble metals. Preferably, the noble metals are of the platinum group of the periodic table of elements which are known in the art as a catalytically effective coating.

Further advantages and the essential characteristics of the invention are contained in the following description, which explains in more detail the embodiments of the invention which is schematically shown in the drawing.

Figure 2:
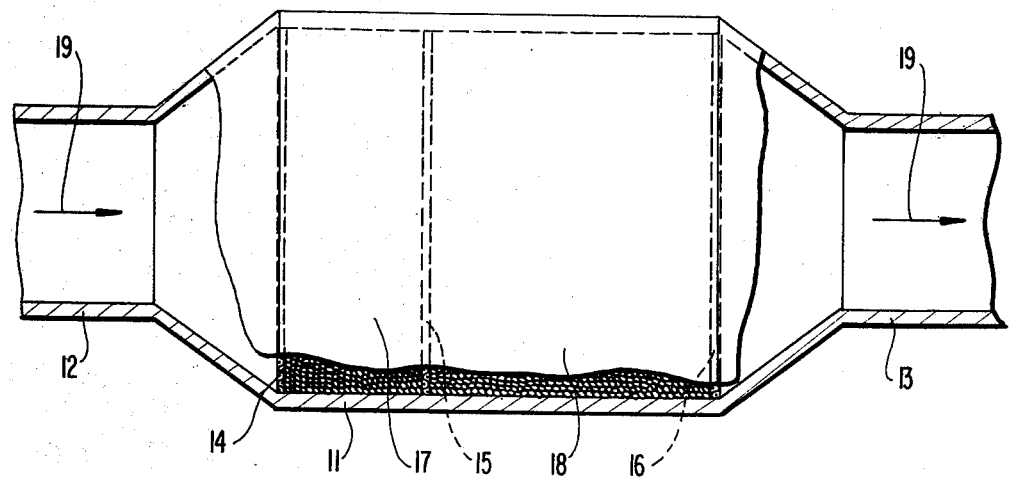

FIG. 1 is a longitudinal section through a converter for the purification of exhaust gas showing a monolithic catalyst according to the invention; and FIG. 2 is a longitudinal section through a converter for the purification of exhaust gas packed with a bulk particulate material catalyst.

In FIG. 1 of the drawing, the catalytic exhaust gas purification system includes a housing, or cannister, 2 for retaining a monolithic carrier 5, by means of an intermediate layer 6 being under tension and consisting of for example; a ceramic layer of fibers. The housing is inserted into or otherwise attached to an exhaust gas pipe 3, 4. The exhaust gas pipe 3 is attached to the collecting pipe of the internal combustion engine for the exhaust gas not shown here in detail, while the exhaust gas pipe 4 leads to the exhaust system, so that the exhaust gas flows through the exhaust gas purification system in the direction of the arrows 9.

According to the invention monolithic catalyst unit 5 has a forward section 7, and a rear section 8. Only the rear section 8 is provided with a catalytically active coating of noble metal, preferably one of the platinum group. The forward section 7 of the catalytic unit remains without any catalytically active coating of noble metal, but in order to be able to absorb substantially all of the contaminating components, such as lead, phosphorus and zinc compounds, which impair the catalytic layer, the forward section 7 is coated with an absorbing surface. Such a surface can be obtained by numerous ways as for example; through the use of an intermediate layer, sometimes called a washcoat. A washcoat is customarily provided during the coating of monolithic carrier bodies, between the actual inert carrier body and the catalytic layer of noble metal. The washcoat is most commonly a coating formed by depositing a solution, suspension or dispersion of catalytically active alumina; i.e. $\gamma$-alumina. The chemical composition and deposition techniques required to form a catalytically active washcoat are well known in the art.

The production of the catalyst according to the invention therefore takes place in the customary manner by applying the intermediate layer, consisting preferably of aluminum oxides ($Al_2O_3$), over the entire length of the carrier body, and subsequently only the rearward portion of the catalyst section 8 is coated with a catalytically active noble metal or mixture thereof.

Alternatively, the forward catalyst section 7, viewed in the direction of flow of the exhaust gas, the actual length of which should amount to at least about 2.5 cm, corresponding to about 1 inch, may also be provided with a catalytically active coating of a non-noble metal or non-noble metal oxide, which is considered more favorable pricewise as compared to the coating of noble metal, but generally does not show the same high catalytic activity. It is true that this activating layer too would be impaired in its activity over a period of extended usage by the contaminating components of the fuel such as lead, phosphorus, zinc and others, however, this impairment is relatively less of a problem because of the relation to the cost of the coating.

In the case of the embodiment of the exhaust gas purification system shown in FIG. 2, a bulk particulate material catalyst is retained in a housing, or cannister, 11 inserted into the exhaust gas pipe 12, 13. This housing consists of a first partial container 17 defined by sieve-like, punctured metal sheets 14 and 15, and a second partial container 18 defined by the punctured metal sheets 15 and 16. Both containers 17 and 18 may be filled with spherical or granular aluminum oxide bulk material. The bulk material in the first container 17 is without any noble metal coating and the bulk material in the second partial container 18 is provided with the catalytically active metal coating. In this case too, the bulk material in the first partial container 17, if so desired, can also be provided with a catalytically active non-noble metal or metal oxide coating.

The second partial container 18 may be filled with a mixture consisting of bulk material coated with noble metals or metal oxides. In this case too, the actual length of the first partial container 17 should be at least about 2.5 cm, corresponding to about 1 inch, so that as much as possible of the poisoning elements can be deposited out in this area of the catalyst before they reach the second portion, or noble metal, catalyst chamber.

Experiments have shown that about 50% of the poisoning elements including lead, phosphorus and zinc which are capable of being precipitated on a monolithic catalyst unit can be precipitated on the first 2.5 cm of said catalyst. An additional approximately 20% of the poisoning elements are deposited in the succeeding area between 2.5 and 5 cm. By not coating these areas of the carrier with catalytically active substances consisting essentially of noble metals, a considerable saving in noble metals will result. In addition, the catalytic activity of the catalyst is made more constant over a longer period of time, since the deposit of the poisoning elements on the catalytic layers had been decreased.

While the inert carrier has been described in terms of pellets or monoliths, any other shape may also be used for purposes of this invention. Likewise, catalytically inert material other than alumina may be used. These materials are well known in the art. Also, for the catalytically active washcoat many suitable materials may be used as is widely known in the art. Noble metals, mixtures and alloys for the catalytically active metal component of this invention are widely known and any suitable type can be used for purposes of this invention.

We claimed:

1. apparatus for the purification of exhaust gases from an internal combustion engine comprising a housing for a noble metal catalyst, which noble metal catalyst is protected from catalyst poisons contained in exhaust gas from an internal combustion engine and emanating from the fuel used in said engine, said hosuing being fitted into the exhaust gas line of the internal combustion engine, wherein the catalyst comprises an inert carrier, having a washcoat being capable of absorbing the catalyst poisons, and being deposited on the entire length thereof, and a catalytically active coating deposited on part of the washcoat, the catalytically active coating essentially consisting of noble metal being deposited only on the rearward part of the catalyst in the direction of the exhaust gas flow, and the forward portion of the washcoat, being free from catalytically active coating and serving as the absorbant, extending to a length of at least about 2.5 cm.

2. In the apparatus as defined in claim 1 wherein the carrier is a monolithic carrier body with parallel flow channels passing through axially, which has a forward section relative to the direction of flow of the exhaust gas, with an essentially absorbing surface and which has a rearward portion relative to the direction of flow of the exhaust gas, whereby only the rearward portion is provided with a catalytically active coating containing noble metals.

3. In the apparatus as defined in claim 1 wherein the catalyst comprises a container filled with particulate bulk material as the inert carrier, which container is divided into a first partial container relative to the direction of flow of the exhaust gas, for retaining the particulate bulk material and a second partial container disposed behind said first partial container relative to the direction of flow of the exhaust gas, for retaining particulate bulk material coated with essentially catalytically active noble metals.

* * * * *